(12) United States Patent
Bennett et al.

(10) Patent No.: US 7,497,082 B1
(45) Date of Patent: Mar. 3, 2009

(54) CENTER SECTION FOR HYDRAULIC TRANSMISSION

(75) Inventors: Michael L. Bennett, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 252 days.

(21) Appl. No.: 11/613,628

(22) Filed: Dec. 20, 2006

Related U.S. Application Data

(60) Provisional application No. 60/753,296, filed on Dec. 22, 2005.

(51) Int. Cl.
*F16H 47/02* (2006.01)
*F16H 57/02* (2006.01)

(52) U.S. Cl. ............................. 60/487; 60/453; 60/489

(58) Field of Classification Search .................. 60/453, 60/487, 489
See application file for complete search history.

(56) References Cited

U.S. PATENT DOCUMENTS

| | | | |
|---|---|---|---|
| 4,903,545 A | 2/1990 | Louis et al. | |
| 5,074,195 A | 12/1991 | Ohashi et al. | |
| 5,314,387 A | 5/1994 | Hauser et al. | |
| 5,505,279 A | 4/1996 | Louis et al. | |
| 6,122,996 A | 9/2000 | Hauser et al. | |
| 6,301,885 B1 | 10/2001 | Johnson et al. | |
| 6,390,227 B1 | 5/2002 | Abend et al. | |
| 6,467,263 B2 * | 10/2002 | Johnson et al. | ............... 60/454 |
| 6,715,283 B2 | 4/2004 | Abend et al. | |
| 7,040,092 B1 | 5/2006 | Buescher | |

FOREIGN PATENT DOCUMENTS

JP 05-172204 7/1993

* cited by examiner

*Primary Examiner*—Thomas E Lazo
(74) *Attorney, Agent, or Firm*—Neal Gerber Eisenberg LLP

(57) ABSTRACT

A two piece center section assembly for mounting inside the housing of a hydrostatic or hydraulic drive apparatus is disclosed. The assembly includes separate pump and motor support portions that are preferably generally identical in structure. The need for fasteners between the pump and motor portions is eliminated.

20 Claims, 8 Drawing Sheets

US 7,497,082 B1

CENTER SECTION FOR HYDRAULIC TRANSMISSION

CROSS-REFERENCE

This invention claims the priority of U.S. Provisional Patent Application Ser. No. 60/753,296 filed on Dec. 22, 2005. This prior application is referenced herein in its entirety.

BACKGROUND OF THE INVENTION

This invention relates to a center section for use in a hydrostatic transmission ("HST"), an integrated hydrostatic transaxle ("IHT") or other hydraulic drive device.

Center sections containing hydraulic porting for connecting a rotating hydraulic pump and motor are known in the art and are disclosed in, e.g., commonly owned U.S. Pat. Nos. 5,314,387 and 6,122,996, the terms of which are incorporated herein by reference. The invention disclosed herein is an improved center section for use in an IHT or an HST, where the center section is of a two-piece design. Two-piece center sections for use in an IHT are also known and are disclosed, for example, in commonly owned U.S. Pat. No. 7,040,092, the terms of which are incorporated herein by reference.

SUMMARY OF THE INVENTION

The subject invention relates to an improved method for assembling and mounting a two-piece center section in a transmission housing. It also discloses a center section where the elements are preferably identical in construction and thus interchangeable.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

Figure 1:
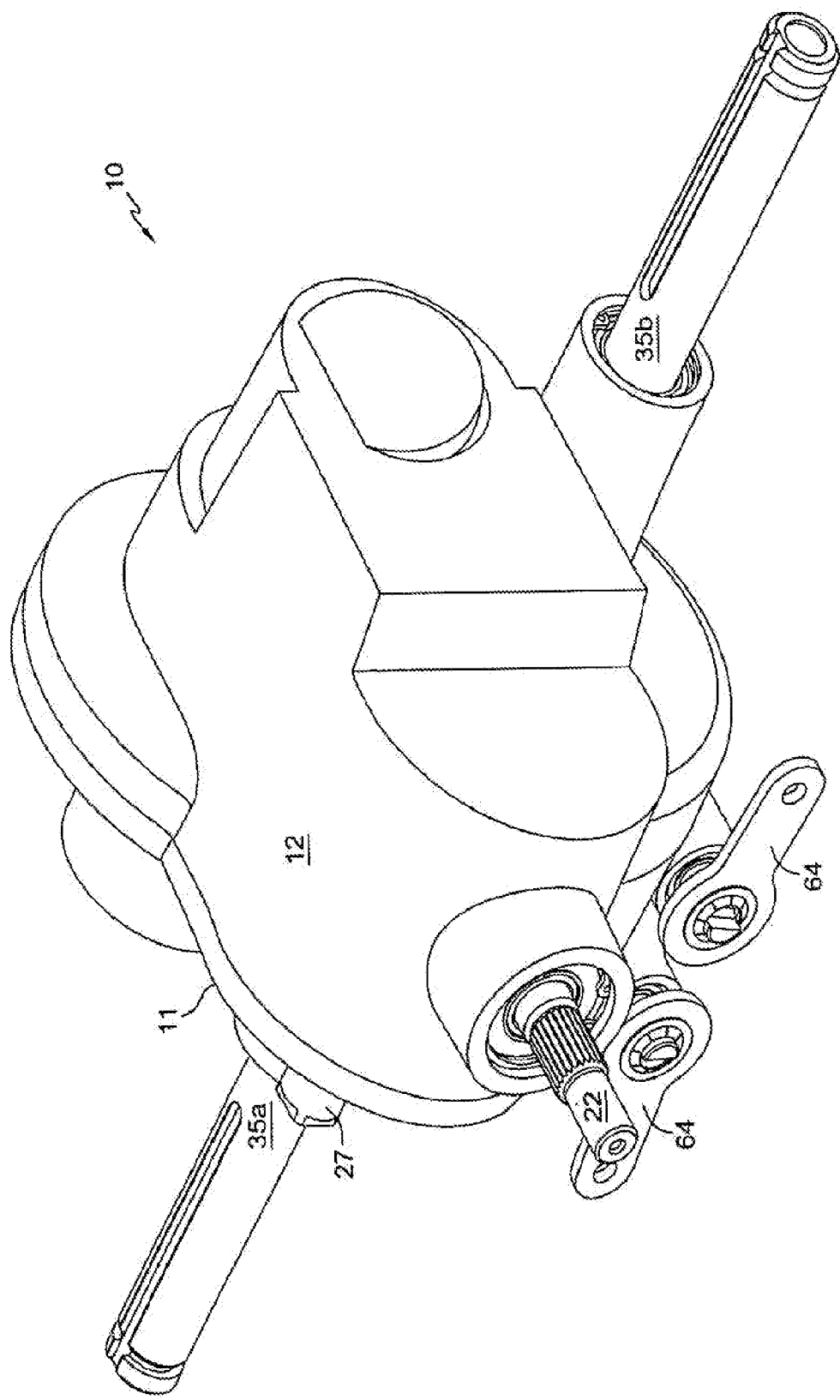
FIG. 1 is a perspective view of an exemplary hydraulic drive apparatus in which a center section assembly in accordance with the present invention is mounted.
Figure 2:
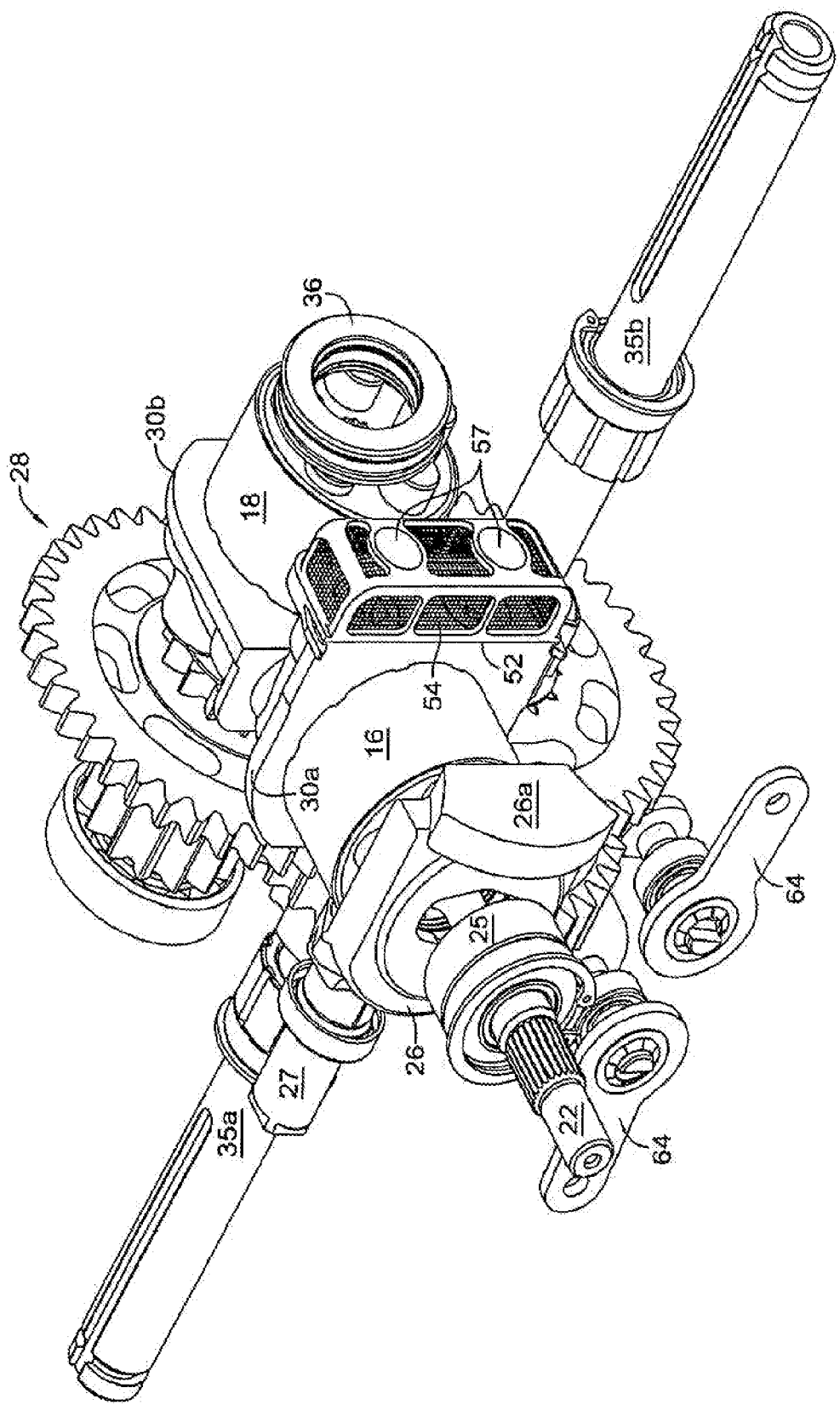
FIG. 2 is a perspective view of the hydraulic drive apparatus shown in FIG. 1, with the housing elements removed to show the internal structure of the apparatus, including a center section in accordance with the present invention.

An exemplary drive apparatus 10 in accordance with the present invention is shown in FIG. 1, where housing members 11 and 12 are joined along a split line perpendicular to the output axles 35a and 35b. The hydraulic features of drive apparatus 10 are shown most clearly in FIG. 2, which is similar to FIG. 1 but where housing members 11 and 12 have been removed for clarity.

Figure 3:
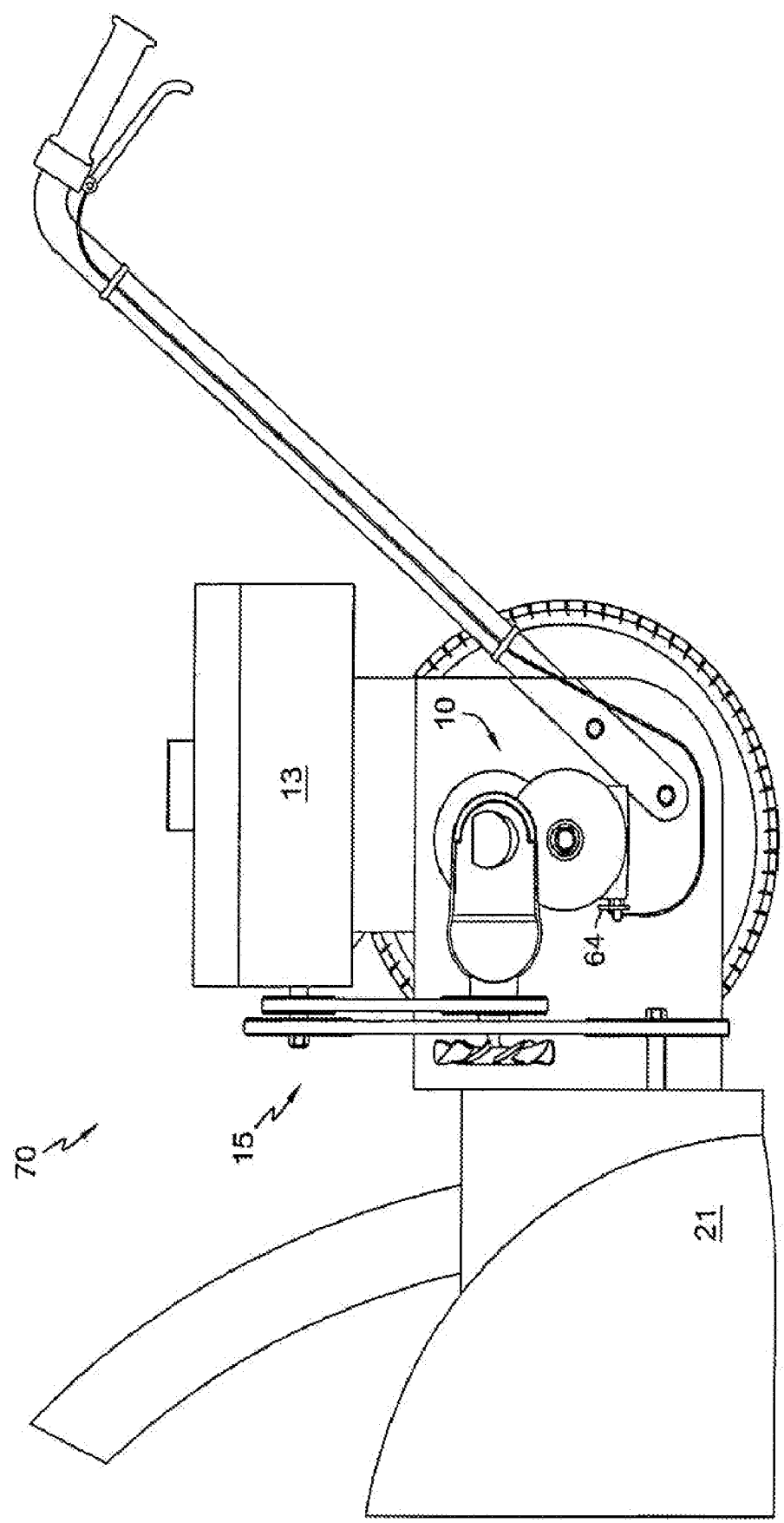
FIG. 3 is an elevational view of an exemplary vehicle incorporating the hydraulic drive apparatus shown in FIG. 1.

It will be understood that the invention disclosed herein may be used in various types of drive mechanisms and for various applications, such as vehicles, industrial applications, etc. In the embodiment depicted in FIG. 3, drive apparatus 10 is used in snow thrower 70, having prime mover 13 powering both drive transmission 10 and snow thrower device 21 through pulley system 15.

In depicted embodiment, input shaft 22 extends into housing member 12, where it is supported by bearing 25, and is splined to pump assembly 16 comprising cylinder block (not shown) and pump pistons (not shown) in a known manner. Swash plate 26 is engaged to pump assembly 16 to control the output of pump assembly 16. Trunnion arm 27 extends from swash plate 26 and through housing member 11 to a control mechanism (not shown). Support member 26a is formed as part of the swash plate 26 to engage an internal surface (not shown) in housing member 12 for support.

Figure 4:
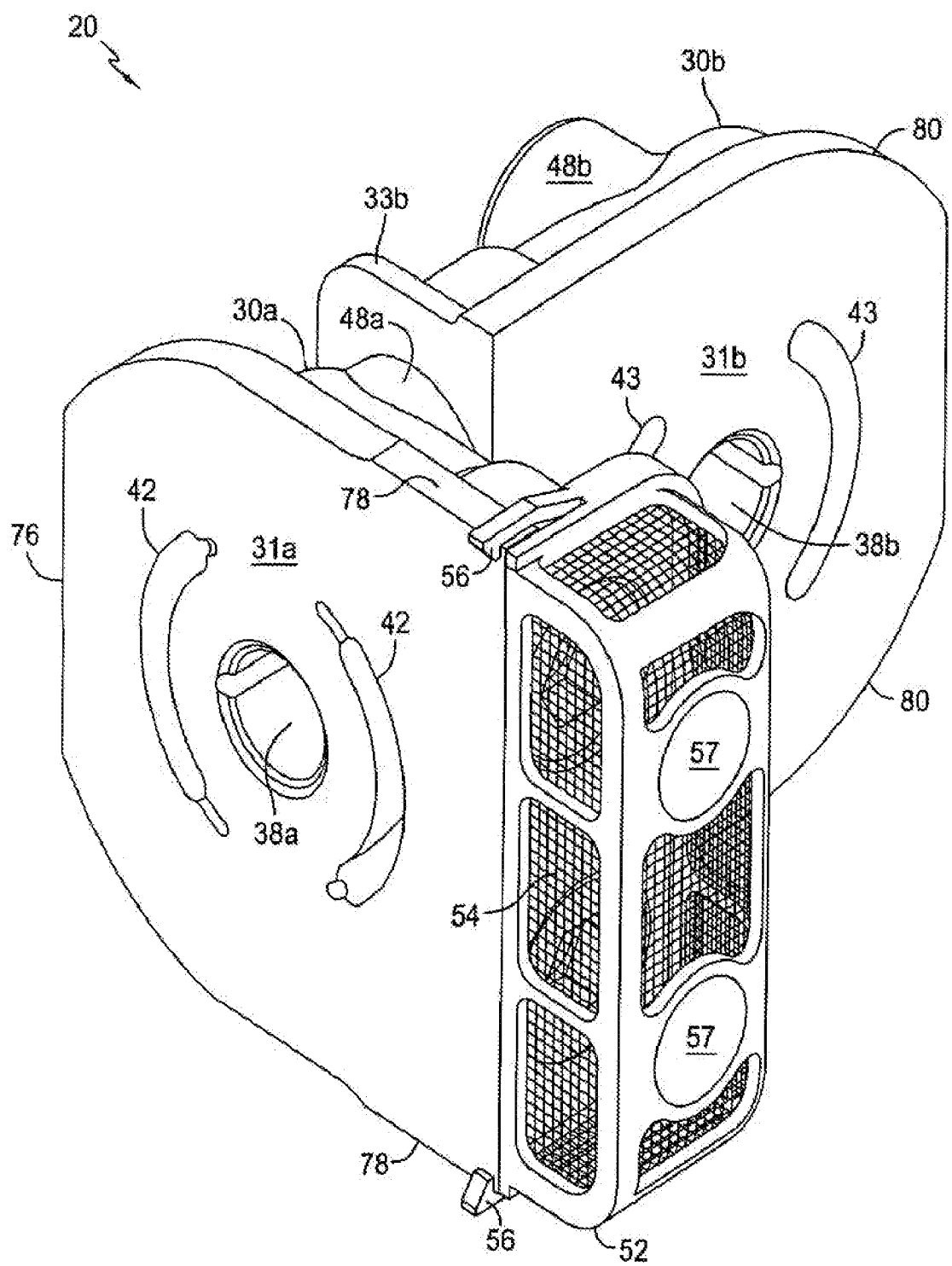
FIG. 4 is a perspective view of a two-piece center section in accordance with the subject invention.
Figure 5:
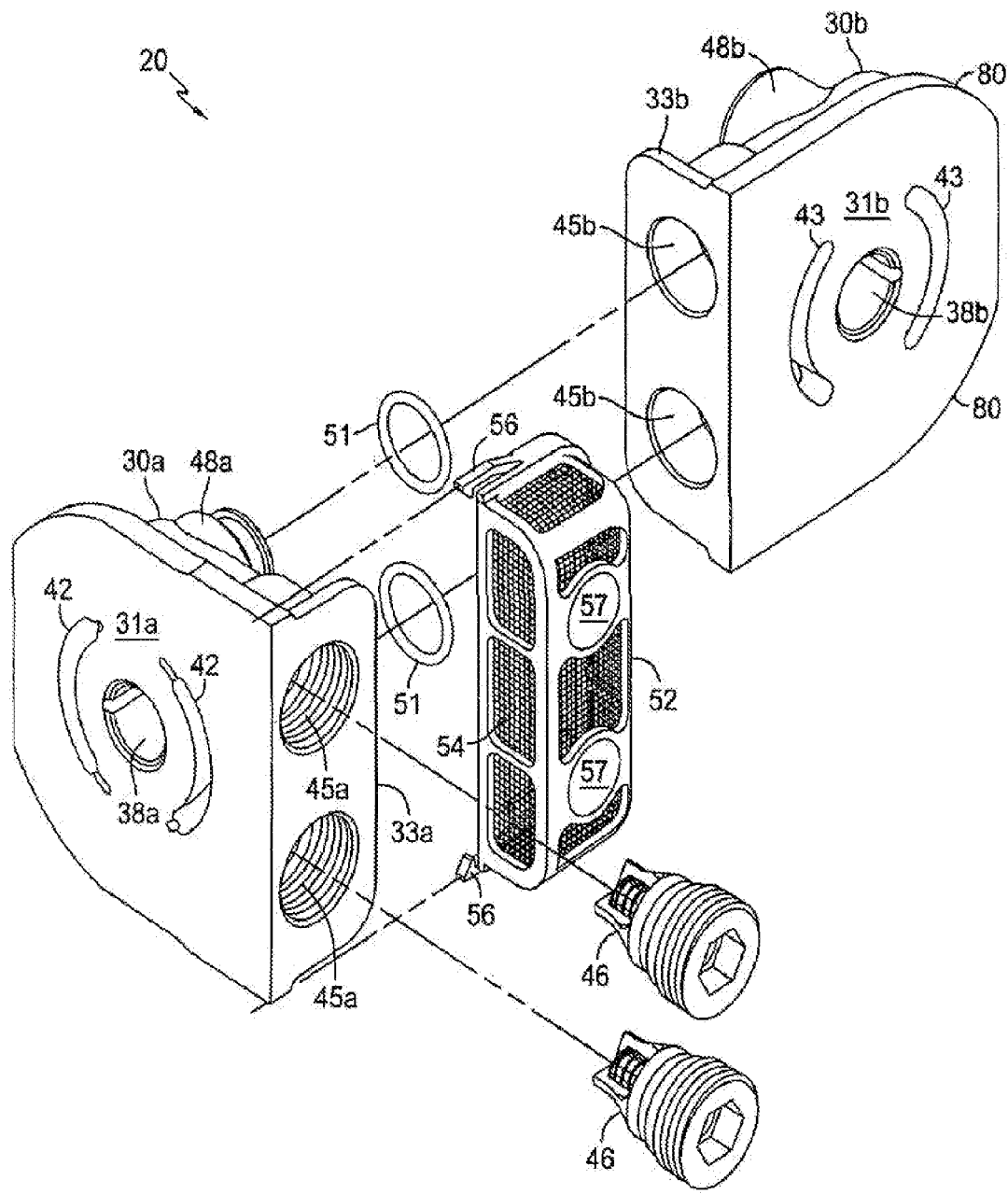
FIG. 5 is an exploded perspective view of the center section.
Figure 6:
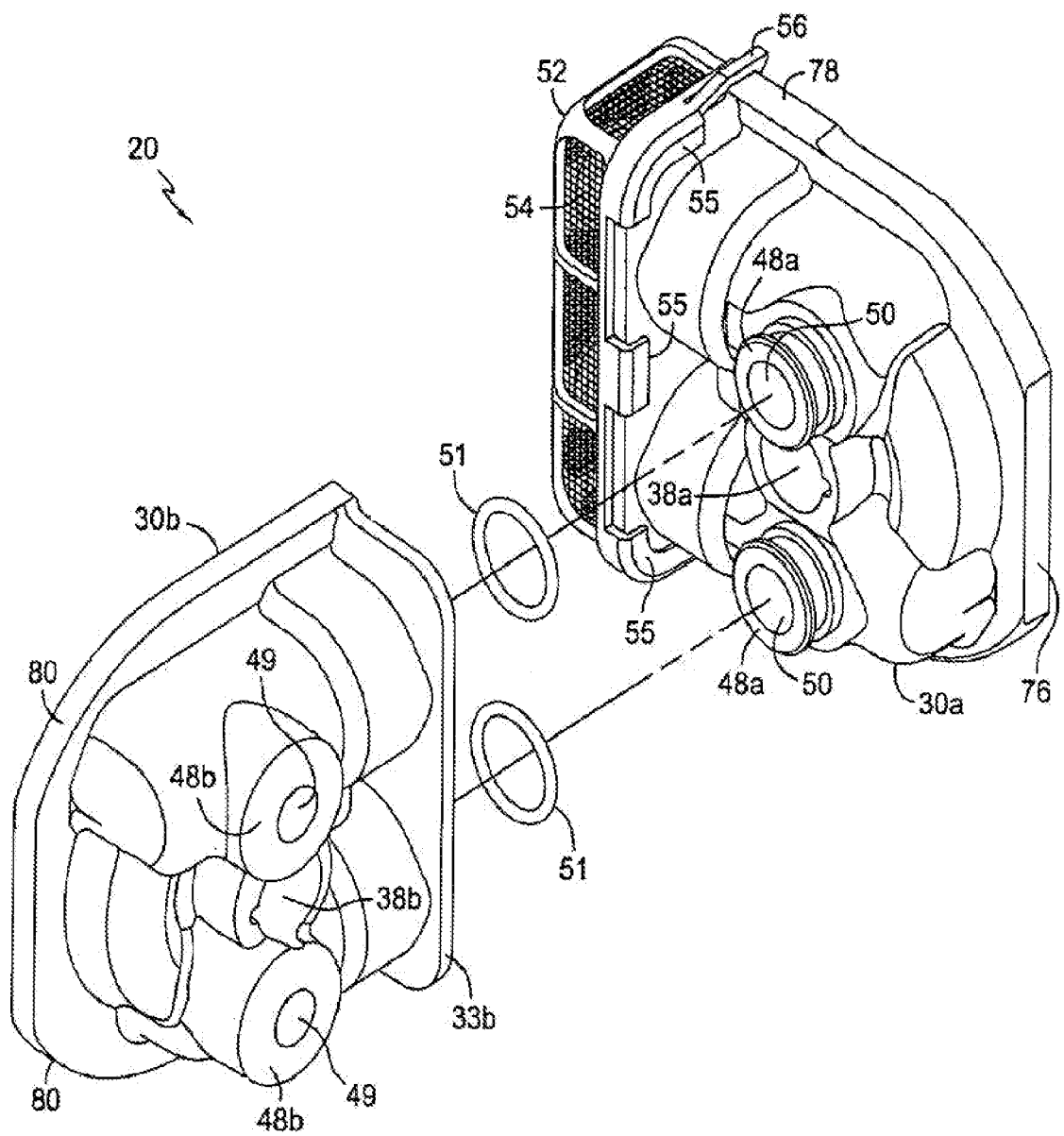
FIG. 6 is a further exploded perspective view of the center section.

The two piece center section 20 is shown most clearly in FIGS. 4-6. In the depicted embodiment, center section 20 comprises separate elements 30a and 30b which are formed from the same casting and are thus similar in construction. This similarity reduces costs since it eliminates the need for different parts and simplifies assembly. In the embodiment depicted herein, element 30a is being used to support pump assembly 16 and element 30b is being used to support motor assembly 18; for the sake of clarity the different features of each will be described in connection with these functions.

Elements 30a and 30b may be described as being essentially identical, in that they contain the same features and are cast or otherwise created in an identical manner in order to reduce costs. Elements 30a and 30b are thereafter operationally differentiated through various machining processes to create features associated with extensions 48a, kidney ports 42 and 43, and port openings 45a and 45b, depending on the use of the respective center section element.

Element 30a comprises an opening 38a on cylinder block running surface 31a through which pump input shaft 22 extends. Cylinder block running surface 31a supports pump assembly 16, and the pair of kidney ports 42 connect pump assembly 16 to hydraulic porting (not shown), as described below. Flange 33a, as shown in FIG. 5, extends generally perpendicular to running surface 31a and includes a pair of port openings 45a formed therein, as will be discussed in more detail below.

Motor assembly 18 is rotatably supported on running surface 31b of element 30b and drives a motor shaft (not shown) in a known manner. Thrust bearing 36 is fixed in housing member 12 and engaged to motor assembly 18. Opening 38b is formed to permit the motor shaft to extend through center section element 30b to drive gear train 28, as described below.

Center section 20 includes hydraulic porting which, in the depicted embodiment, comprises kidney ports 42 and 43, a pair of extensions 48a and 48b and a pair of port openings 45a and 45b. The porting in both elements 30a and 30b cooperates to form a closed hydraulic circuit connection between pump assembly 16 and motor assembly 18. Additional porting (not shown) is formed inside the two center section elements 30a and 30b to connect the various openings described.

Both of the center section elements 30a and 30b have a pair of generally cylindrical extensions 48a and 48b, respectively, formed on a surface generally opposite running surfaces 31a and 31b thereof. Generally cylindrical extensions 48b are cast such that a web 49 blocks access to porting formed inside element 30b. Openings 50 are formed in extensions 48a to permit the porting formed in element 30a to communicate with the porting formed in element 30b once element 30a is assembled to element 30b.

Figure 7:
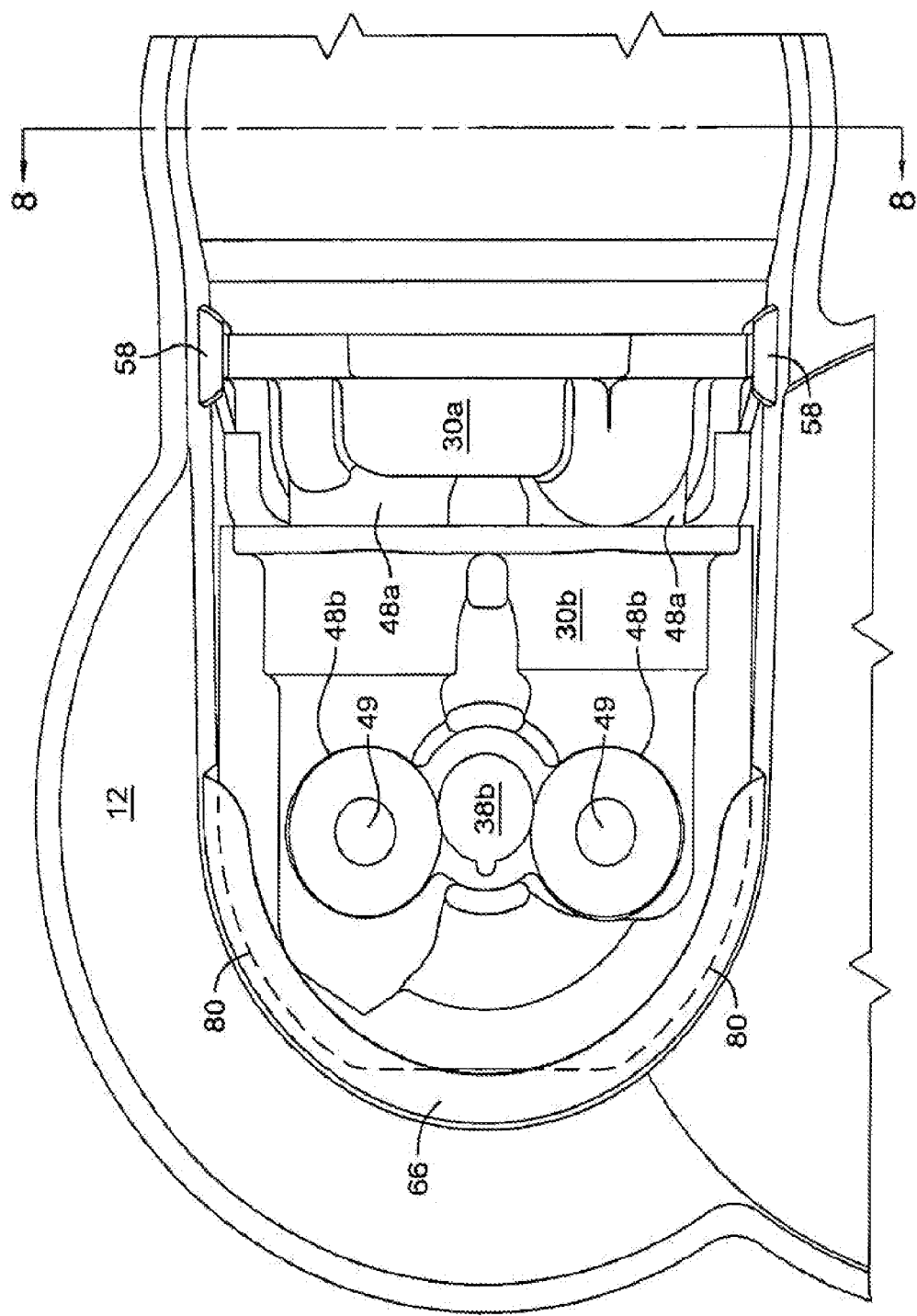
FIG. 7 is an elevational view of the center section in accordance with the subject invention mounted in a housing.

In the depicted embodiment, extensions 48a on element 30a extend into port openings 45b on element 30b, and are sealed by o-rings 51, to create a portion of the closed hydraulic circuit. This connection eliminates the need for separate fasteners connecting elements 30a and 30b. Moreover, as is known in the art, each pump piston (not shown) of pump assembly 16 comprises a spring (not shown), biasing each pump piston against swash plate 26. This spring force also acts against element 30a, maintaining the position and hydraulic communication between elements 30a and 30b. Tabs 58 and support element 60 further constrain element 30a, as described below, and as shown in FIG. 7.

Center section element 30a includes a pair of port openings 45a formed in flange 33a, with a pair of check valves 46 threaded therein to permit hydraulic fluid to be brought into the closed hydraulic circuit when needed, a filter comprising filter housing 52 with dispersion plates 57 and mesh filter 54 located therein, is connected to flange 33a by means of protrusion 55 and fingers 56, which permit filter housing 52 to be slid onto the edges of flange 33a and snapped in place, without the need for additional fasteners. In this embodiment protrusions 55 are formed away from filter housing 52 lower surface in a hook-like shape in order to capture the edge of flange 33a while snap fingers 56 clip onto running surface 31a. Protrusions 55 may be formed in segments as shown in FIG. 6 or may be continuous to capture more area of flange 33a. This configuration may improve separation of the filtered fluid from the sump when certain materials are used to form filter housing 52. Dispersion plates 57 prevent damage to mesh filter 54 from possible bleed fluid ejected from check valves 46.

The motor shaft is connected to and drives gear train 28. In this particular application, gear train 28 drives output axles 35a and 35b, respectively, without the need for a differential. Control mechanisms 64 extend outside housing 12 to separately control output to axles 35a and 35b. Obviously such a drive mechanism is not critical to this invention, and the center section disclosed herein could be used with other drive devices.

Figure 8:
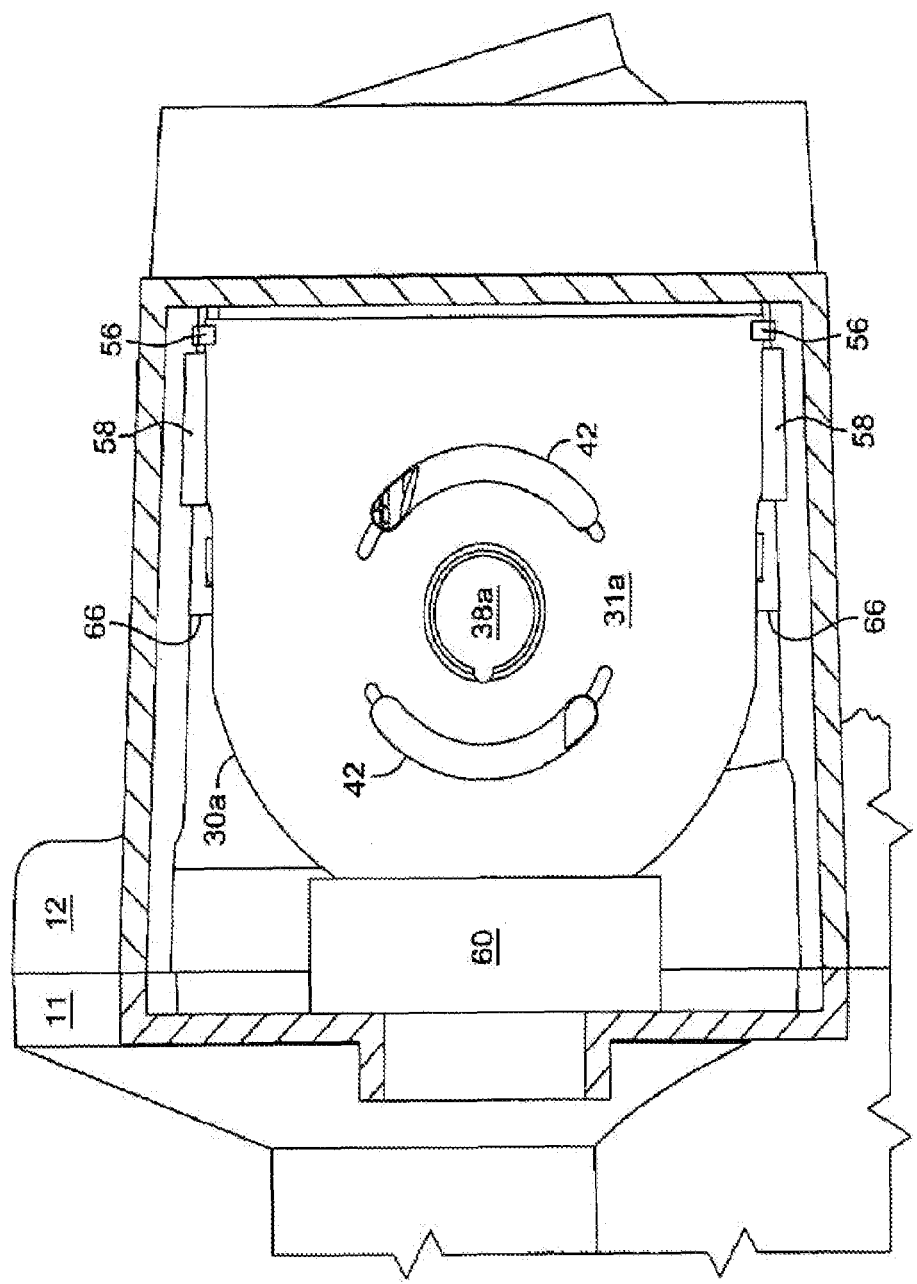
FIG. 8 is a sectional view along the lines 8-8 in FIG. 7.

A further feature of this center section design is that it can be mounted in a housing without the need for any separate fasteners. Such designs have been used in the past, but generally include separate projections, or "wings" extending from one portion of the center section. One widely known design is shown in Japanese Publication No. 05-172204, where the center section includes separate "wings" extending from opposite sides thereof to engage corresponding slots in the sides of the housing. The present invention eliminates the need for separate wings or projections by using primary running surface edges 76, 78 and 80 of center section elements 30a and 30b as a means by which center section 20 is secured to the housing. As shown in FIGS. 7 and 8, housing member 12 includes a channel 66 which cooperates with running surface edge 80 to constrain center section element 30b. Center section 30b slides into channel 66 and is thus secured to housing 12. Element 30a interfaces with element 30b by extensions 48a with pre-positioned o-rings 51 extending into port openings 45b. Center section element 30a is secured to housing member 12 by tabs 58 contacting running face edge 78. Center section element 30a is further constrained by support member 60 formed on side housing 11 securing element 30a along running face edge 76.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:

1. A center section for use in connection with a hydraulic drive apparatus having a housing and a sump, the center section comprising:
   a first member having a first hydraulic porting system formed therein, the first member further comprising:
   a first running surface for a first cylinder block;
   a first bottom surface formed generally opposite the first running surface and having a plurality of first extensions protruding therefrom, each first extension having a passage open to the first hydraulic porting system; and
   a first mounting flange having a plurality of first openings formed therein for connection to the first hydraulic porting system;
   a second member separably connected to the first member and having a second hydraulic porting system formed therein, the second member further comprising:
   a second running surface for a second cylinder block;
   a second mounting flange having a plurality of second openings formed therein for connection to the second hydraulic porting system, wherein the second openings are shaped to receive the first extensions of the first member to connect the first and second hydraulic porting systems to form a closed hydraulic circuit; and
   a plurality of check valves mounted in the first openings in the first mounting flange to selectively connect the closed hydraulic circuit to the sump.

2. The center section of claim 1, wherein the first extensions are selectively machined prior to connection.

3. The center section of claim 1, further comprising a filter secured to the first mounting flange to filter fluid entering the closed hydraulic circuit through the check valves.

4. The center section of claim 3, wherein the filter comprises a filter housing secured to an outer periphery of the first mounting flange.

5. The center section of claim 4, wherein the filter housing comprises a plurality of fingers and protrusions to engage the first mounting flange and secure the filter housing to the center section.

6. The center section of claim 1, further comprising a first edge extending around at least a portion of the periphery of the first running surface and a second edge extending around at least a portion of the second running surface, where both edges cooperate with corresponding portions of the housing to retain the center section to the housing.

7. The center section of claim 1, wherein the first cylinder block is part of a hydraulic pump assembly rotatably disposed on the first running surface, and the second cylinder block is part of a hydraulic motor assembly rotatably disposed on the second running surface.

8. A center section for use in connection with a hydraulic drive apparatus having a sump, the center section comprising:
   a first member separably connected to a second member, each member comprising:
   a hydraulic porting system formed in the member,
   a running surface on which a cylinder block may be rotatably disposed, and a pair of arcuate ports located on the running surface to connect the cylinder block to the hydraulic porting system;
   a bottom surface formed generally opposite the running surface and having a plurality of extensions protruding therefrom, wherein the extensions of one of the members are open to permit fluid communication with the hydraulic porting system, and wherein the extensions of the other member are closed to prevent fluid flow therethrough; and a flange comprising a plurality of openings formed therein for connection to the hydraulic porting system, each opening in the flange of each member being shaped to accept one of the plurality of extensions protruding from the other member, whereby the extensions of one member are inserted into the flange openings of the other member so that the hydraulic porting systems in each member are connected to form a single closed hydraulic circuit.

9. The center section of claim 8, wherein the open extensions are selectively machined prior to insertion into the respective flange openings.

10. The center section of claim 8, further comprising a filter secured to the flange of one of the members to filter fluid entering the closed hydraulic circuit through a plurality of check valves.

11. The center section of claim 10, wherein the filter comprises a filter housing secured to an outer periphery of the flange to which the filter is secured.

12. The center section of claim 11, wherein the filter housing comprises a plurality of fingers and protrusions to secure the filter housing to the center section.

13. A center section for use in connection with a hydraulic drive apparatus, the center section comprising a pair of essentially identical members separably connected together to form a single center section assembly, wherein each member comprises:

a running surface on which a cylinder block may be disposed;

a hydraulic porting system formed therein;

a mounting face having a plurality of openings formed therein for connection to the hydraulic porting system; and a plurality of extensions protruding from a bottom surface formed generally opposite the running surface, wherein the extensions and openings are cooperably shaped to permit the mounting face of either one of the center section members to be secured to the bottom surface of the other center section member to connect the two hydraulic porting systems to create a closed hydraulic circuit.

14. The center section of claim 13, wherein the plurality of extensions on one of the members is selectively machined before the extensions are inserted into the openings of the other member.

15. The center section of claim 13, further comprising a plurality of check valves disposed in the openings formed in the mounting face of one of the members.

16. The center section of claim 15, further comprising a filter secured to the mounting face of one of the essentially identical members to filter fluid entering the closed hydraulic circuit through the plurality of check valves.

17. The center section of claim 16, wherein the filter comprises a filter housing secured to an outer periphery of the mounting face of the one of the essentially identical members by a plurality of fingers and protrusions.

18. The center section of claim 13, wherein each center section member further comprises an edge extending around at least a portion of the periphery of the running surface, where the edges of both center section members cooperate with corresponding portions of a housing to retain the center section in the housing.

19. A hydraulic drive apparatus comprising:

a housing forming a sump;

a center section assembly mounted in the sump and comprising a pump running surface, a motor running surface, and hydraulic porting formed therein;

a flange generally perpendicular to the pump running surface;

a pair of openings formed in the center section flange and extending in a direction generally parallel to the pump running surface; and a pair of check valves mounted in the openings;

a filter member secured to the flange, whereby hydraulic fluid entering the check valves from the sump is filtered before it enters the hydraulic porting.

20. A hydraulic drive apparatus comprising:

a housing member forming a sump;

a center section assembly located in the sump and comprising a pump running surface, a motor running surface and a hydraulic porting system, wherein each running surface comprises an edge extending lower from and generally perpendicular to the running surface;

a pump cylinder block disposed on the pump running surface and a motor cylinder block disposed on the motor running surface;

at least a first receiving member formed in the housing to receive the edge of the pump running surface; and at least a second receiving member formed in the housing to receive the edge of the motor running surface.

* * * * *